(12) United States Patent
Okada et al.

(10) Patent No.: US 7,338,754 B2
(45) Date of Patent: Mar. 4, 2008

(54) MICRO-LENS ARRAY SUBSTRATE AND PRODUCTION METHOD THEREFOR, AND PROJECTION TYPE LIQUID CRYSTAL DISPLAY UNIT USING THOSE

(75) Inventors: Kuniaki Okada, Tenri (JP); Yukiko Nagasaka, Tenri (JP); Kazuya Kitamura, Tenri (JP); Yoshihiro Sekimoto, Soraku-gun (JP); Yukio Kurata, Tenri (JP); Hiroshi Nakanishi, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 10/509,538

(22) PCT Filed: Mar. 14, 2003

(86) PCT No.: PCT/JP03/03125

§ 371 (c)(1),
(2), (4) Date: Sep. 28, 2004

(87) PCT Pub. No.: WO03/083525

PCT Pub. Date: Oct. 9, 2003

(65) Prior Publication Data
US 2005/0174649 A1 Aug. 11, 2005

(30) Foreign Application Priority Data
Mar. 29, 2002 (JP) ............................. 2002-093737

(51) Int. Cl.
*G02F 1/13* (2006.01)

(52) U.S. Cl. ........................................ 430/321; 216/26
(58) Field of Classification Search ................. None
See application file for complete search history.

(56) References Cited

U.S. PATENT DOCUMENTS

| 5,633,737 A | 5/1997 | Tanaka et al. |
| 6,594,079 B1 * | 7/2003 | Trott et al. ............... 359/456 |

FOREIGN PATENT DOCUMENTS

| JP | 09-090336 | 4/1997 |
| JP | 11-338379 | 12/1999 |
| JP | 2000-098102 | 4/2000 |
| JP | 2001-255660 | 9/2001 |
| JP | 2001-341210 | 12/2001 |

OTHER PUBLICATIONS

Fujita et al., "Fabrication method of double micro lens array substrate," Japan Society of Applied Physics.
Okada et al., "31a-W-11 Fabrication of double micro lens arrays using a self-alignment exposure method," Japan Society for Precision Engineering.

(Continued)

*Primary Examiner*—John A. McPherson
(74) *Attorney, Agent, or Firm*—David G. Conlin; Steven M. Jensen; Edwards Angell Palmer & Dodge LLP (57) ABSTRACT

In a micro-lens array substrate (12) that includes first and second micro-lens arrays (6, 7) respectively having a plurality of lenses, the first micro-lens array (6) is sandwiched between two inorganic dielectric substrates (21, 24), and the second micro-lens array (7) is formed on one of the two inorganic dielectric substrates (21, 24).

18 Claims, 7 Drawing Sheets

OTHER PUBLICATIONS

Kitamura et al., "Fabrication Method of Double Micro Lens Array Using Self-Alignment Technology," 9th Microoptics Conference (MOC '03) Tokyo, Oct. 29-31, 2003, pp. 114-117.

Kitamura et al., "Fabrication Method of Double-Microlens Array Using Self-Alignment Technology," Japanese Journal of Applied Physics, vol. 43, No. 8B, 2004.

* cited by examiner

MICRO-LENS ARRAY SUBSTRATE AND PRODUCTION METHOD THEREFOR, AND PROJECTION TYPE LIQUID CRYSTAL DISPLAY UNIT USING THOSE

TECHNICAL FIELD

The present invention relates to a double-layered micro-lens array substrate, and a production method of the micro-lens array substrate. The invention also relates to a single-plate projection type liquid crystal display device using such a micro-lens array substrate for a liquid crystal display element.

BACKGROUND ART

Comparing with a projection cathode-ray tube display device, a projection type liquid crystal display device has more attractive features such as a wider range of color reproduction, better mobility due to small size and light weight, no need for a convergence adjustment as it is not affected by earth magnetism, and so on. Since the screen size of the projection type liquid crystal display device can be increased easily, the projection type liquid crystal display device is expected to prevail as a mainstream of home-use image display device in the future.

Among color projection type image display modes utilizing liquid crystal display element, there is three-panel mode in which three panels of liquid crystal display element are respectively used for three primary colors, and a single-panel mode in which only one panel of liquid crystal display element is used. In the three-panel mode, an optical system and three panels of liquid crystal display element are independently provided, wherein the optical system divides a white beam into three primary colors, R, G and B, and the respective color beams are controlled by the three panels of liquid crystal display element, so as to form an image. Full color display is achieved by optically superimposing images of the respective colors.

Some of the advantages of the three-panel mode are that light being emitted from a white beam source is efficiently utilized, and that the color purity is high. However, it is difficult to reduce the cost and size of a liquid crystal display device of the three-panel mode, as it requires the color separation function and the image formation function, which consequently makes its optical system to become more complicated with a larger number of components.

On the other hand, a liquid crystal display device of the single-panel mode utilizes only one panel of liquid crystal display element with a color filter pattern shaped in mosaic, stripe, or the like for three primary colors. Images are displayed by projecting light on the liquid crystal display element, using an optical system for projection. The image display device of the single-panel mode is suitable for low-cost and small projection systems, because it requires only one panel of liquid crystal display element, and the structure of its optical system is simpler than one in the three-panel mode.

However, a disadvantage of the liquid crystal display device of the single-panel mode is that it can use only a ⅓ of incident light due to absorption or reflection of light that occurs at its color filter. For a solution, Japanese Unexamined Patent Application No. 181487/1995 (Tokukai 7-181487; published on Jul. 21, 1995) discloses a color-filterless single-panel mode liquid crystal display device in which two layers of micro-lens arrays are used.

A single-panel mode liquid crystal display device is described below with a reference to FIG. 1. In the liquid crystal display device of the single-panel mode shown in FIG. 1, dichroic mirrors 5G, 5R and 5B are arranged in a sector form, and first and the second micro-lens arrays 6 and 7 are arranged on the side of a light source in a liquid crystal display element 20. The dichroic mirrors divide white light from a white beam source 2 into R, G and B, and cause the divided beams to enter the first and second micro-lens arrays 6 and 7 at different angles. After passing the first micro-lens array 6, the light beams of the respective colors are refracted by the second micro-lens array 7 so that the principal rays of the respective colors R, G and B separated by the dichroic mirrors 5G, 5R, and 5B become substantially parallel to one another. The respective light beams refracted by the second micro-lens array 7 separately fall on liquid crystal regions driven by signal electrodes that are independently impressed with color signals corresponding with R, G and B.

The single-panel mode liquid crystal display device does not use an absorbing color filter; therefore, not only the efficiency of using light improves but also the principal rays of respective colors after passing the micro-lens arrays are made substantially parallel to one another. In other words, the single-panel mode liquid crystal display device provides remarkably bright images by restraining diffusion of the principal rays of the respective colors before they reach a projection lens 10, and by preventing decrease in light quantity caused by scattering at the projection lens 10.

In the double-layer micro-lens array described in the foregoing publication, micro-lens arrays are attached on both sides of a glass substrate.

Fabrication method of a double-layer micro-lens array is disclosed in Japanese Unexamined Patent Application No. 90336/1997 (Tokukai 9-90336; published on Apr. 4, 1997). In this method, first and second micro-lens arrays are fabricated separately, and the lens surface of the first micro-lens array is jointed with the polished surface of the second micro-lens array.

In the prior art thus described, a double-layer micro-lens array is produced by forming micro-lens arrays on both sides of a glass substrate, or by jointing two micro-lens arrays together. This, however, poses the problem of high manufacturing cost associated with difficulties in optical-axes alignment, as described below.

The micro-lens array substrate, which possesses two layers of micro-lens array, requires a process of optical axes alignment for two of the micro-lens arrays. In other words, the two micro-lens arrays must have the same angle in all directions, including vertical, horizontal and rotational directions, in order to ensure optical properties of the lenses.

However, the required accuracy for the optical-axes alignment is ±1 μm, due to a microscopic structure of the lens pattern. This has made the production of double-layer micro-lens array substrates extremely difficult.

Moreover, a middle layer between the two layers of micro-lens array is another cause of difficulty in the optical-axes alignment. Specifically, the presence of a gap between the two layers of lens pattern prevents the alignment marks for position adjustment of the two layers to be simultaneously focused for inspection. The optical axes alignment can be carried out by providing separate alignment mark observation systems for the respective layers. However, in this case, the alignment mark observation systems still require accurate optical-axes alignment. Thus, as described above, a middle layer between the two layers of micro-lens array has also been a cause of high cost of a positioning apparatus.

The present invention was made in view of the foregoing problems and an object of the invention is to provide a micro-lens array substrate, which can be produced by a simple process with easy optical-axes alignment, and to provide a production method of a micro-lens array substrate, as well as a projection type liquid crystal display device.

DISCLOSURE OF INVENTION

In order to achieve the foregoing object, a micro-lens array substrate in accordance with the present invention includes first and second micro-lens arrays respectively having a plurality of lenses, wherein the first micro-lens array is sandwiched between two inorganic dielectric substrates, and the second micro-lens array is formed on one of the two inorganic dielectric substrates.

According to this configuration, the first micro-lens array and the second micro-lens array are respectively formed on inorganic dielectric substrates, which undergo only slight thermal expansion. Therefore, it is possible to prevent a heat-caused misregistration of the lens pitches between the respective micro-lens arrays.

Moreover, since the lenses of second micro-lens array are patterned using the first micro-lens array, alignment of optical-axes for these two micro-lens arrays is no longer required.

Thus, since the present invention prevents a lens-pitch misregistration and does not require alignment of optical-axes for the micro-lens arrays, it becomes possible to produce a highly accurate micro-lens array substrate at low cost.

Moreover, in order to achieve the foregoing object, a production method of a micro-lens array substrate in accordance with the present invention includes the step of:

forming on an inorganic dielectric substrate a first micro-lens array with a plurality of lenses;

applying a photosensitive resin on the first micro-lens array;

patterning the photosensitive resin by irradiation of ultraviolet light or visible light; and forming a second micro-lens array using the patterned photosensitive resin as a mask, said step of patterning the photosensitive resin being carried out using a beam that has transmitted through the first micro-lens array.

According to this method, the first micro-lens array is formed on the inorganic dielectric substrate, which undergoes only slight thermal expansion. Therefore, a heat-caused misregistration of the lens pitches between the two micro-lens arrays is prevented.

Further, since the lenses of the second micro-lens array are patterned using the first micro-lens array, optical-axes alignment for these two micro-lens arrays becomes unnecessary.

Thus, since the present invention prevents a lens-pitch misregistration and does not require alignment of optical-axes for the micro-lens arrays, it becomes possible to produce a highly accurate micro-lens array substrate at low cost.

Additional objects, features, and strengths of the present invention will be made clear by the description below. Further, the advantages of the present invention will be evident from the following explanation in reference to the drawings.

BRIEF DESCRIPTION OF DRAWINGS

FIG. 3(a) to FIG. 3(f) are diagrams showing production steps in a first production method of a micro-lens array substrate.

FIG. 7(a) to FIG. 7(e) are diagrams showing production steps in a second production method of a micro-lens array substrate.

FIG. 8(a) to FIG. 8(c) are diagrams showing production steps in a third production method of a micro-lens array substrate.

BEST MODE FOR CARRYING OUT THE INVENTION

An embodiment in accordance with the present invention is described below with references to the attached drawings.

Figure 1:
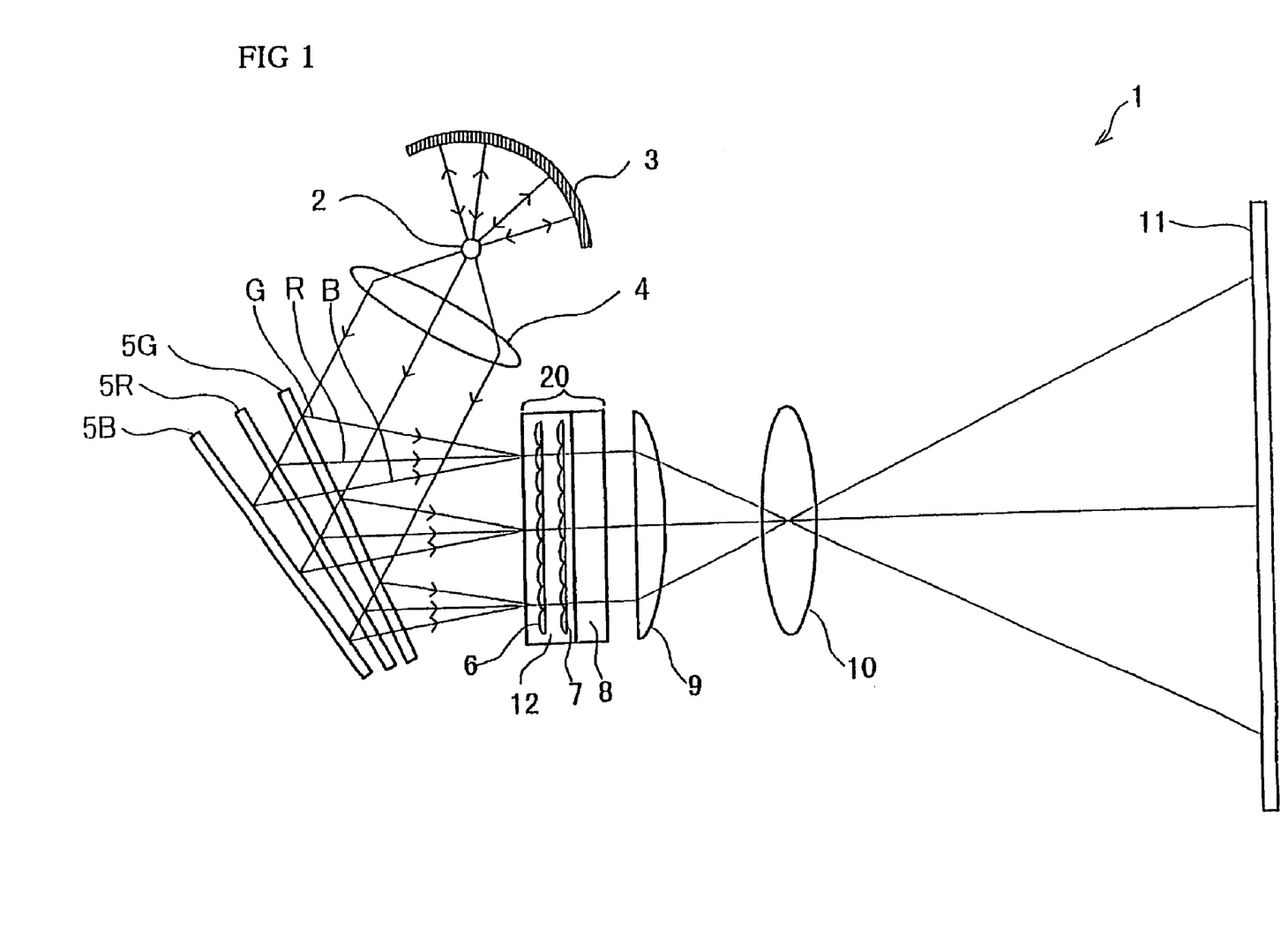
FIG. 1 is a schematic view showing a structure of a projection type liquid crystal display device.
Figure 2:
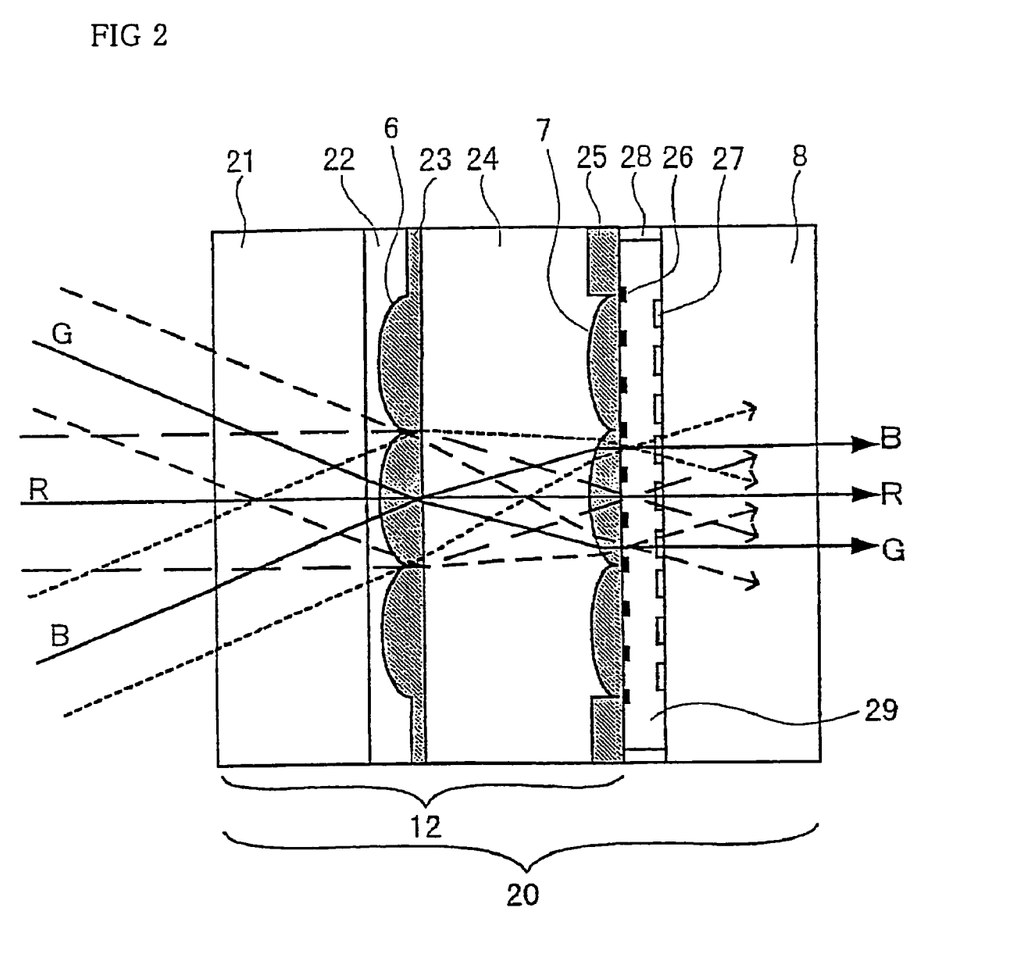
FIG. 2 is a cross sectional view showing a liquid crystal display element in which a micro-lens array substrate in accordance with the present invention is provided.

FIG. 1 is a cross sectional view showing the overall configuration of a projection type liquid crystal display device in accordance with the present invention, and FIG. 2 is a cross sectional view of a micro-lens array substrate and a liquid crystal display element in accordance with the present invention, used in a transmissive liquid crystal display device.

A projection liquid crystal display device 1 shown in FIG. 1 includes a spherical mirror 3 provided behind a white beam source 2. The spherical mirror 3 is positioned so that its center coincides with the emission center of light in the white beam source 2. In front of the white beam source 2, a condenser lens 4 is provided. The condenser lens 4 is positioned so that its focal point coincides with the emission center of light in the white beam source 2.

By such arrangement, a substantially parallel white beam is obtained from the condenser lens 4. In addition, the method of obtaining a parallel beam from the white beam source 2 is not limited to such configuration, and for example, a method using a revolving parabolic mirror, or a method using a revolving elliptic mirror and an integrator can also be adopted.

In front of the condenser lens 4, three kinds of dichroic mirrors 5G, 5R and 5B (beam separation means) are provided at different angles. The dichroic mirrors 5G, 5R and 5B lie in this order on the optical axis, and selectively reflect light of wavelength bands corresponding to green, red and blue, respectively, and transmit light in the other wavelength bands. Furthermore, the symbols G, R and B respectively stand for Green, Red and Blue.

Among three dichroic mirrors 5G, 5R and 5B, the dichroic mirror 5G closest to the white beam source 2 is disposed so that a beam from the white beam source 2 enters it, for example, at an incident angle of about 30°.

The other dichroic mirrors 5R and 5B are disposed at positions created by angle φ when the dichroic mirror 5G is tilted counterclockwise in steps of angle φ from its original position about a rotational axis that extends in a direction perpendicular to the plane of paper in FIG. 1.

The relative angle φ is set to satisfy $$P = f \tan \phi,$$

where P is the pixel array pitch of the liquid crystal display element 20, and f is the focal length of the first micro-lens array 6 in the liquid crystal display element 20.

In this way, the beams of the respective wavelength bands of green, red and blue are incident on the first micro-lens array 6 with an angle difference of 2φ from one another.

When a white beam is emitted from the white beam source 2 towards the dichroic mirrors 5G, 5R and 5B, the white beam is divided into three primary colors, because the dichroic mirrors 5G, 5R and 5B reflect beams of the respective wavelength bands.

The beams of the respective colors G, R and B enter the first micro-lens array 6 at different angles corresponding with the angles the dichroic mirrors 5G, 5R and 5B are disposed. The beams through the first micro-lens array 6 travel through the second micro-lens array 7, and are condensed on signal electrodes corresponding with the respective colors (described later). When the signal electrodes are driven by their respective image signals, the intensity of the condensed beams are modulated according to the signals.

In a direction of outgoing light from the liquid crystal display element 20, a field lens 9 and projection lens 10 are provided as projection means. Next to the projection lens 10 in this direction is a screen 11. The focal length of the field lens 9 is set between the field lens 9 and the projection lens 10.

With this configuration, the beams of the respective colors modulated in the liquid crystal display element 20 are converged to a position of the projection lens 10 as they pass through the field lens 9, and the projection lens 10 projects the light beams on the screen 11, thereby realizing color image display on the screen 11. Note that, the configuration may be adapted to cause the outgoing light from the liquid crystal display element 20 to directly fall on the projection lens 10, instead of using the field lens 9.

The liquid crystal display element 20 used in this embodiment is described in detail with reference to FIG. 2. The liquid crystal display element 20 includes a glass substrate 8 and a micro-lens array substrate 12, and between the glass substrate 8 and the micro-lens array substrate 12, a liquid crystal layer 29 is provided.

The glass substrate 8, which is provided on the outgoing side of light, has signal electrodes 27 on its micro-lens side. The signal electrodes 27 are provided to cause phase change in the liquid crystal layer 29. The micro-lens array substrate 12, which is provided on the light incident side, has scanning electrodes (not shown in the figure) on its liquid crystal element side. The scanning electrodes are provided perpendicular to the signal electrodes. In addition, the signal electrodes 27 and scanning electrodes are transparent electrodes made of ITO (Indium Tin Oxide) or the like.

The micro-lens array substrate 12 further includes two layers of micro-lens array, including the first micro-lens array 6 and the second micro-lens array 7.

The first micro-lens array 6 is provided between a silica substrate (inorganic dielectric substrate) 21 and a silica glass sheet (inorganic dielectric substrate) 24. The silica substrate 21 and silica glass sheet 24 are made of an inorganic dielectric material, and are substantially transparent to visible light and ultraviolet light. The first micro-lens array 6 has a lens pattern defined by the interface of a low-refractive ultraviolet curable resin 22 and a high-refractive ultraviolet curable resin 23, whose refraction indexes are different from each other.

The interface between the silica glass sheet 24 and a high-refractive ultraviolet curable resin 25, whose refraction indexes are different from each other, also defines a lens pattern, forming the second micro-lens array 7. In addition, for the high-refractive ultraviolet curable resin 25, a material with higher refractive index than that of the silica glass sheet 24 is selected.

The lens pattern of the micro-lens arrays may be spherical, hexagonal or semi-cylindrical. For the second micro-lens array in particular, a trapezoidal prism may be used for the lens pattern.

The optical axes of the lenses constituting the first micro-lens array 6 and the optical axes of the lenses constituting the second micro-lens array 7 are parallel to each other. In other word, the first micro-lens array 6 and the second micro-lens array 7 has the same optical axes for the lenses that oppose each other.

By such configuration, the second micro-lens array 7 can be fabricated by photolithography, using the first micro-lens array 6 as a mask. Thus, highly accurate position registration can be realized. More specifically, position registration can be carried out within ±1 μm.

It should be noted here that, if plastic resin is used for the silica substrate 21, a required shape and flatness may not be obtained for the first micro-lens array 6 to be used as a mask. In such case, required accuracy may not be obtained for the shape of the second micro-lens array produced by using the first micro-lens array as a mask. Therefore, the first micro-lens array 6 needs to be formed between the silica substrate 21 and the silica glass sheet 24, as described above.

The reason the inorganic dielectric material is used for the substrates provided on the both sides of the first micro-lens array 6 is that it undergoes only slight thermal expansion, is strong, and can be planarized desirably by polishing. Thus, a highly flat surface can be provided for the second micro-lens array by forming the second micro-lens array 7 on the polished inorganic dielectric material.

Further, with the use of the same material for the silica substrate 21 and the silica glass sheet 24, there will be no displacement of the lenses between the respective layers of the first micro-lens array 6 and the second micro-lens array 7 caused by thermal expansion. As a result, an ideal configuration can be obtained.

Further, since the white beam is separated by the dichroic mirrors 5G, 5R and 5B, the liquid crystal display element 20 does not require a color filter, and the efficiency of using light will improve.

Image signals corresponding to the respective colors of RGB are impressed to the signal electrodes 27. In addition, as a matter of convenience, FIG. 2 omits some constituting members of the liquid crystal display element 20, including scanning electrodes, polarizers, alignment films, and the like.

Advantageous effects of the configuration of the liquid crystal display element in accordance with the present invention are described below.

In a conventional case in which the liquid crystal display element 20 has only one micro-lens array, beams from dichroic mirrors propagate with an angle 2φ, even after passing through the liquid crystal display element 20. Therefore, a projection lens with a large diameter is needed, in order to capture and project all the light beams.

In this embodiment, however, the second micro-lens array 7 is provided as shown in FIG. 2 to prevent diffusion of outgoing light. The position of the first micro-lens array 6 is set so that the beams that emerge from the first micro-lens array 6 are focused in the vicinity of the light outgoing side of the second micro-lens array 7.

The second micro-lens array 7 so positioned serves as the field lens 9, and collimates the principal rays of the respective beams. Thus, with the second micro-lens array 7, the directions of the respective emergent beams can be made perpendicular to the liquid crystal display element 20, thereby reducing the diffusion angle of the beams from the liquid crystal display element 20. Therefore, with the liquid crystal panel 20 of the present embodiment, all the light beams can be efficiently used even when the projection lens 10 with a small diameter is used.

In this way, the efficiency of using light as well as a white balance of color images are improved, and a costly large diameter lens is no longer needed. Consequently, increasing in the overall cost of the liquid crystal display device can be avoided.

The following describes specific production methods of a micro-lens array substrate in accordance with the present invention.

(First Production Method)

FIG. 3 shows a cross sectional view showing production steps of a double-layer micro-lens array substrate.

Figure 3A:
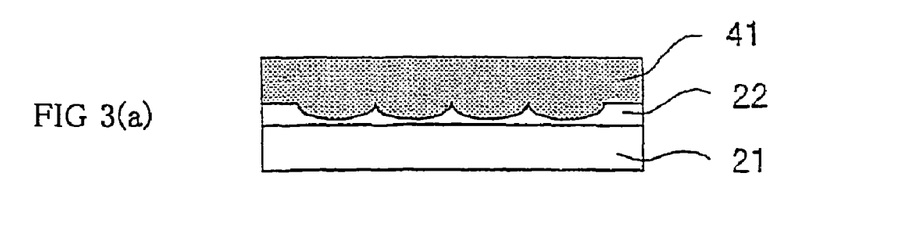

The first micro-lens array 6 is formed by a so-called 2P (Photo-Polymerization) method in which a ultraviolet curable resin, cured by irradiation of ultraviolet light, is used as a photosensitive resin.

First, as shown in FIG. 3(a), a low-refractive ultraviolet curable resin 22 is applied on the silica substrate 21 made of an inorganic dielectric material, and a stumper 41 is placed on the low-refractive ultraviolet curable resin 22. The bottom surface of the stumper 41 has a reversed pattern which coincides with pattern of the second micro-lens array 7.

Pressing down the stumper 41 against the silica substrate 21 with a pressure sufficient to spread the low-refractive ultraviolet curable resin 22 between the stumper 41 and the silica substrate 21, the low-refractive ultraviolet curable resin 22 is irradiated with ultraviolet light through the silica substrate 21, using a ultraviolet lamp or the like.

The low-refractive ultraviolet curable resin 22 irradiated with ultraviolet light undergoes a curing reaction and cures, thus transferring the reversed pattern of the stumper 41 to the low-refractive ultraviolet curable resin 22. After curing, the stumper 41 is lifted to separate the low-refractive ultraviolet curable resin 22 from the stumper 41.

Figure 3B:
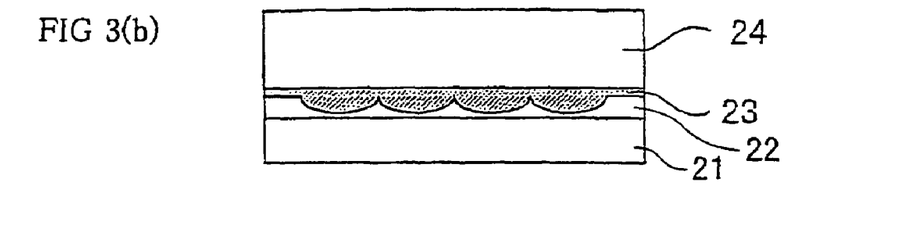

Next, as FIG. 3(b) shows, the high-refractive ultraviolet curable resin 23 is applied on the cured low-refractive ultraviolet curable resin 22, filling the indented portions of the low-refractive ultraviolet curable resin 22. Then, the high-refractive ultraviolet curable resin 23 is pasted with the silica glass sheet 24, which will be the inorganic dielectric middle layer between the first micro-lens array 6 and the second micro-lens array 7.

Next, the silica glass sheet 24 is pressed against the silica substrate 21 with a sufficient pressure, and ultraviolet light is irradiated through the silica glass sheet 24 to cure the high-refractive ultraviolet curable resin 23. The high-refractive ultraviolet curable resin also serves as an adhesive layer for the silica glass sheet 24.

If the silica glass sheet 24 is thicker than a required thickness, a polishing step may be additionally carried out in which the silica glass sheet 24 is ground to a required thickness. The polishing step may be omitted when a device used in the 2P process can be used to control the thickness of the first micro-lens array 6.

Figure 3C:
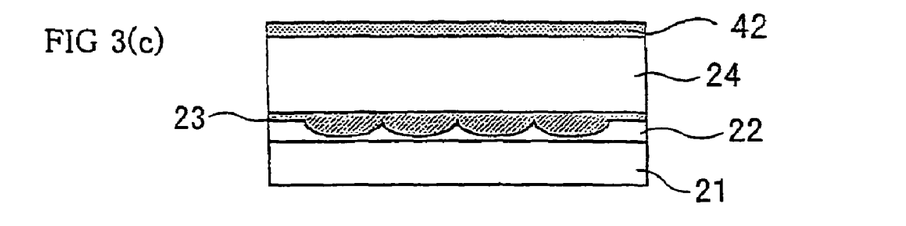

Then, as FIG. 3(c) shows, a resist layer 42 is applied on the silica glass sheet 24. For exposure, the resist layer 42 is irradiated with ultraviolet light through the first micro-lens array 6. Details of this exposure process are described later.

The exposure process is carried out to form a three dimensional structure in the resist layer 42 by irradiation of ultraviolet light with an intensity distribution. In other words, various points on the resist layer 42 will have different amounts of sensed light depending on the intensity distribution of the ultraviolet light, and accordingly the amount of remaining film at these points will also be different after the development. This enables the resist layer 42 to have any form, by adjusting the intensity distribution of the irradiated light.

Figure 3D:
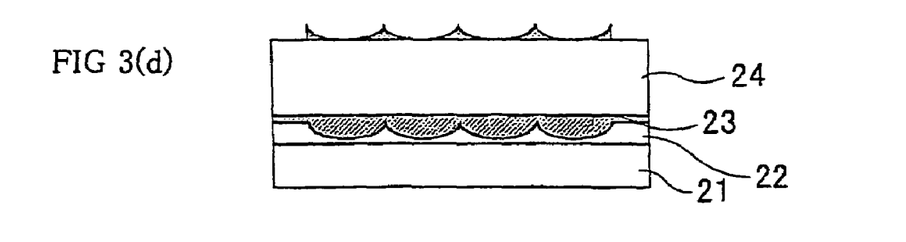

By the process of development carried out after the exposure, as shown in FIG. 3(d), the resist layer 42 is shaped into a lens pattern of the second micro-lens array. A post-bake process is carried out thereafter.

Figure 3E:
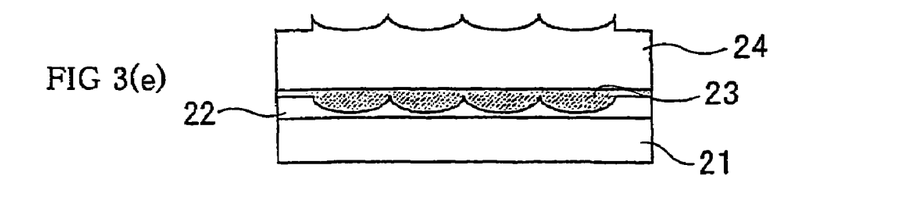

Next, as shown in FIG. 3(e), the lens pattern engraved on the resist layer 42 is transferred to the silica glass sheet 24 by dry etching. The dry etching may be reactive-ion etching, ion trimming or the like.

Here, the thickness of the lens pattern engraved on the resist layer 42 may be augmented depending on etching conditions. For example, if the etching condition is such that the etching selection ratio is 1:2 for the resist and the silica glass, the lens pattern formed in the resist layer 42 with a thickness of 10 μm is augmented to 20 μm in the silica glass sheet 24. Therefore, it is necessary to take into account the etching selection ratio when determining the shape of lens pattern engraved on the resist layer 42.

Figure 3F:
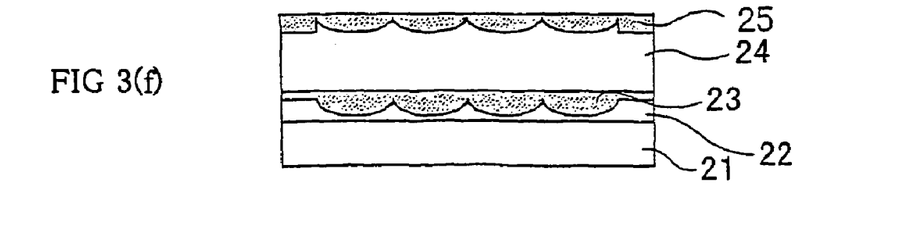

Next, as shown in FIG. 3(f), the high-refractive ultraviolet curable resin 25 is applied on the silica glass sheet 24, filling the indented portions of the silica glass sheet 24. The high-refractive ultraviolet curable resin 25 is then cured by irradiation of ultraviolet light.

Here, the top surface of the high-refractive ultraviolet curable resin 25 is planarized. There are two methods of planarization. In the first method, a flat silica plate treated with a release agent is pressed against the high-refractive ultraviolet curable resin 25 from the top before curing, and the high-refractive ultraviolet curable resin 25 is cured afterward by irradiation of ultraviolet light. After curing, the flat silica plate is released and a smooth top surface is obtained for the high-refractive ultraviolet curable resin 25.

In the second method, the surface of the high-refractive ultraviolet curable resin 25 is planarized by a polishing process after curing.

By following the procedure described above, the micro-lens array substrate 12 is fabricated that includes the second micro-lens array 7 on the first micro-lens array 6.

Furthermore, a black matrix 26 and a transparent electrode film are formed on the micro-lens array substrate 12, and a glass substrate 8 is pasted on the micro-lens array substrate 12 with spacers 28 in between. The liquid crystal display element 20 shown in FIG. 2 is obtained by injecting the liquid crystal layer 29 into the gap between the micro-lens array 12 and the glass substrate 8.

The following describes a principle by which the resist layer is exposed for the formation of the second micro-lens array 7.

As shown in FIG. 2, the focal points of the respective lenses in the first micro-lens array 6 in the projection liquid crystal display device 1 of the present invention are substantially on the surface of black matrix 26, in order to improve the efficiency of using light.

The first micro-lens array 6 and the second micro-lens array 7 are disposed by leaving as much distance as possible in between, and the second micro-lens array 7 is formed in the vicinity of the black matrix 26.

In the fabrication process, the silica glass sheet 24 is pasted on the high-refractive ultraviolet curable resin 23 in such a manner that the upper surface of the silica glass sheet 24 is substantially on the focal plane of the first micro-lens array 6. Therefore, by applying the resist layer on the upper surface of the silica glass sheet 24, the parallel rays of ultraviolet light irradiated through the first micro-lens array 6 condense on a particular point on the resist layer. The resist layer is exposed by thus condensing the ultraviolet light on a particular point.

Supposing that the incident angle of parallel ultraviolet rays is $\theta_i$, the focal length of the first micro-lens array 6 is f, and the distance between a condensing spot and a position where the optical axis of the lens intersects with the focal plane is r, the distance r is represented by:

$r = f \cdot \tan \theta_i$.

Thus, the position of condensing spot can be changed by varying the incident angle of parallel ultraviolet rays.

Figure 4:
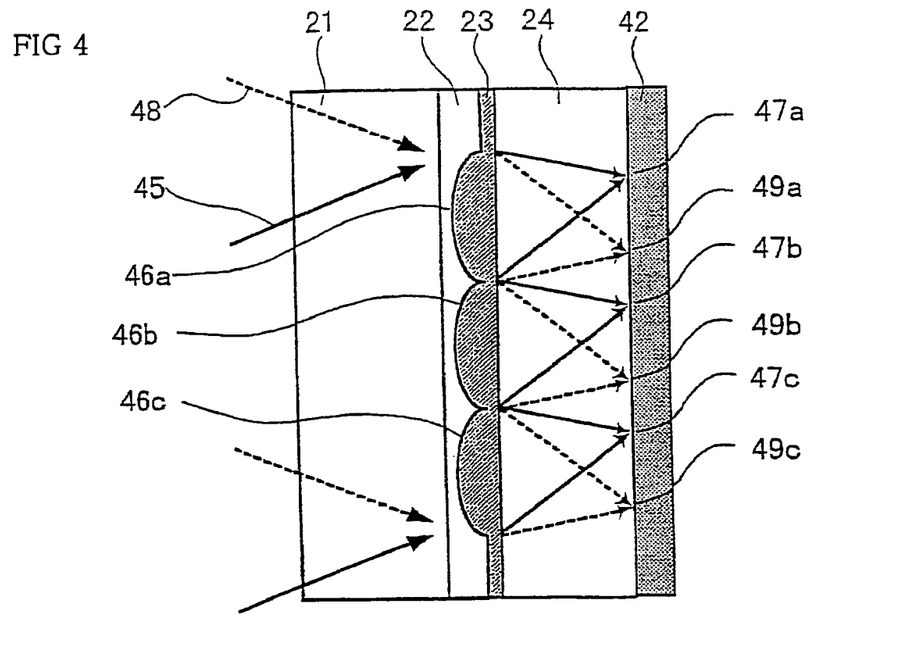
FIG. 4 is a diagram illustrating a principle of a second micro-lens array patterning method in the production method of a micro-lens array substrate in accordance with the present invention.

For example in FIG. 4, when a beam 45 of ultraviolet light has an incident angle $\theta_i$, three micro-lenses 46a, 46b and 46c condenses the beam onto points indicated by reference numerals 47a, 47b and 47c, respectively. The resist layer 42 is exposed at these points.

On the other hand, when a parallel beam 48 has an incident angle $\theta_j$ different from $\theta_i$, the three micro-lenses 46a, 46b and 46c condense the parallel beam 48 onto points indicated by reference numerals 49a, 49b and 49c, respectively. The resist layer 42 is exposed at these points.

The condensing points of micro-lenses can be thus modified by changing the incident angle of the light beam.

Furthermore, in case of using a negative resist for the resist layer 42, the resist layer 42 will be thick where exposure was strong, and will be thin where exposure was weak. That is to say, the shape of resist layer can be controlled by adjusting the time or intensity of exposure.

As described above, the exposure can be carried out at required locations and by a required amount, by controlling the incident angle $\theta_i$ of the parallel UV rays and the duration of exposure (or intensity of irradiated light). In this way, a required resist layer can be exposed to obtain a required pattern.

When the exposure light is parallel rays of ultraviolet light that can irradiate the entire first micro-lens array 6 at even intensity, the resist layer is exposed directly below the respective lenses of the first micro-lens array 6 within the irradiated region. Therefore, the second micro-lens array 7 can be formed in a uniform shape.

Figure 5:
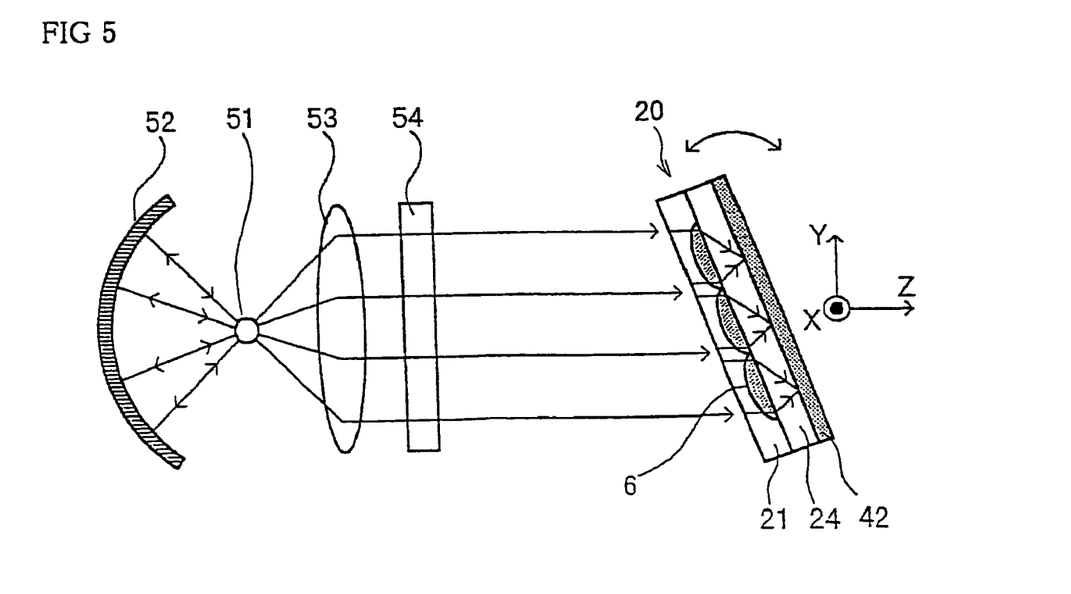
FIG. 5 is a diagram showing a configuration of an exposure optical system used in the production method of a micro-lens array substrate in accordance with the present invention.

In the following, description is made as to an exposure optical system used to conduct the exposure process described above. FIG. 5 shows an example of a configuration of the exposure optical system. As shown in the FIG. 5, the exposure optical system uses a superhigh-pressure mercury lamp 51 as a light source of exposure light. An i-ray (wavelength of 365 nm) of ultraviolet light emitted from the superhigh-pressure mercury lamp 51 is converted to a parallel beam through a spherical mirror 52 and a collimator lens 53, and propagates to the liquid crystal display element 20 through an intensity correction filter 54.

The intensity correction filter 54 is a filter with a transmittance distribution, designed to provide uniform light intensity distribution for the light beams that have passed through the filter. Therefore, the ultraviolet light through the intensity correction filter 54 can irradiate the micro-lens array substrate with uniform light intensity distribution.

The liquid crystal display element 20 is mounted on a rotation stage with two axes of rotation (not shown in the figure). The normal line of the micro-lens array substrate and the optical axis of the parallel ultraviolet rays can be freely tilted by controlling the rotation angle of the rotation stage.

In the present embodiment, the optical axis of the parallel ultraviolet ray is fixed, and the incident angle of the parallel ultraviolet ray to the first micro-lens array 6 is changed by rotating the liquid crystal display element about the X- and Y-axes. A required pattern is formed in the resist layer by controlling the duration of exposure (or intensity of irradiated light) when exposing.

Figure 6:
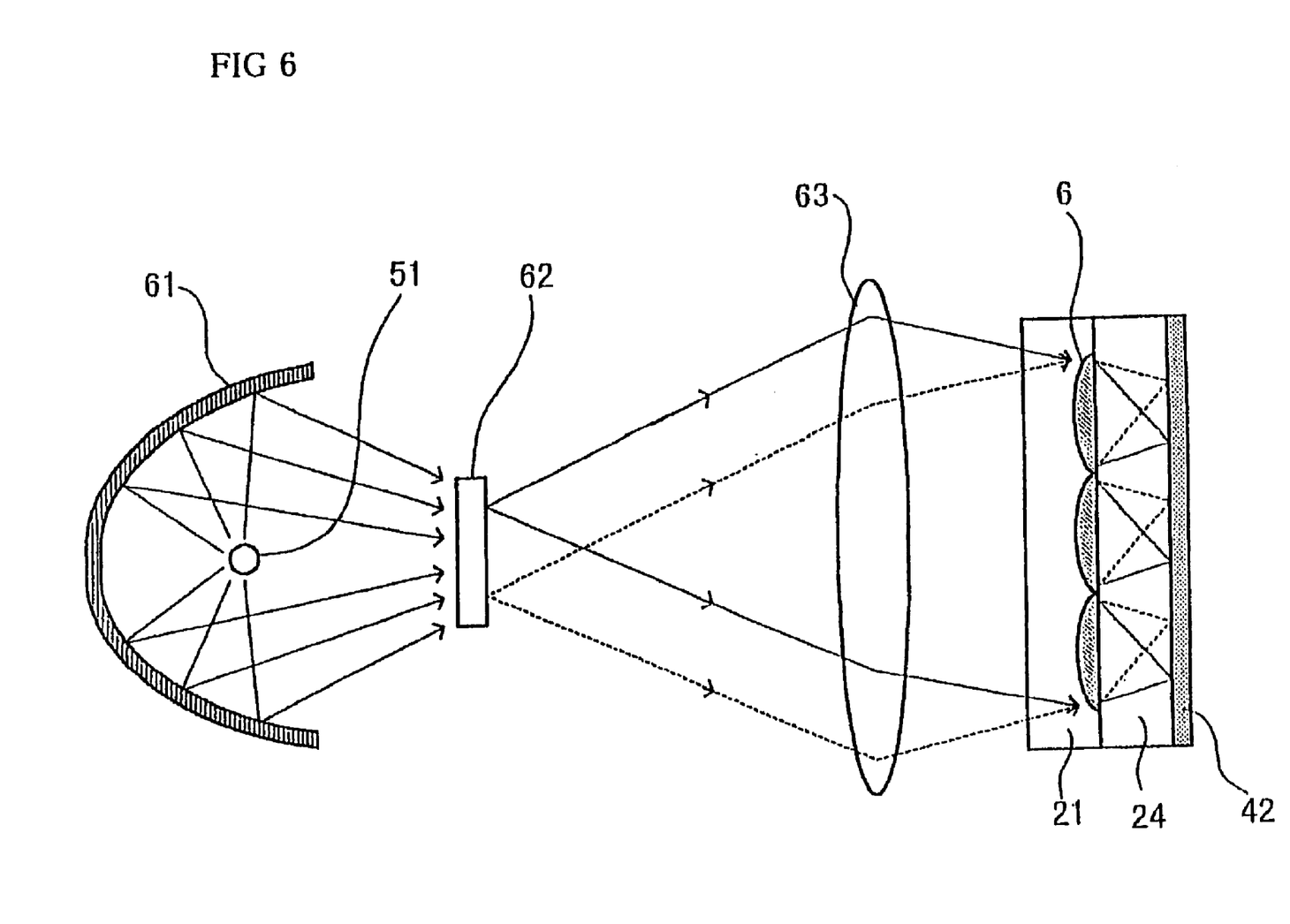
FIG. 6 is a diagram showing another configuration of the exposure optical system used in the production method of a micro-lens array substrate in accordance with the present invention.

FIG. 6 shows another configuration of the exposure optical system. As shown in FIG. 6, the exposure optical system uses the superhigh-pressure mercury lamp 51 as a light source of exposure light. The light emitted from the superhigh-pressure mercury lamp 51 is reflected by a curved mirror 61, and falls on a gray scale mask (transmittance modulation mask) 62. The gray scale mask 62 is a mask with an arbitrary transmittance distribution, which enables the light beams to have required light intensity distribution.

The light transmitted through the gray scale mask 62 passes through a collimator lens 63 and the first micro-lens array 6, and focuses on the focal plane of the first micro-lens array 6. As a result, the resist layer 42 directly below the first micro-lens array 6 is exposed.

That is, the exposure light that converges on the focal plane of the respective lens of the first micro-lens array 6 has a light intensity distribution formed by the gray scale mask 62. Therefore, a resist pattern of a required shape can be formed by controlling the transmittance distribution of the gray scale mask 62.

In the production method of a micro-lens array substrate in the embodiment thus described, the second micro-lens array is patterned through the first micro-lens array, and therefore position misalignment of the respective lenses of the second micro-lens array and the first micro-lens array is dramatically restrained.

Misalignment may also occur in the optical axes of the first micro-lens array and the second micro-lens array when there is tilting of the normal line of the micro-lens array substrate and the optical axis of the exposure light. However, when the focal length of the first micro-lens array is 100 μm, the optical axis misalignment between the lenses can be confined within an acceptable range of 0.9 μm or smaller by setting the tilt angle of optical axis within 0.5°. Since it is easy to set a tilt angle of optical axis within 0.5°, optical axis misalignment between lenses can be restrained when the micro-lens array substrate is fabricated by the production method in accordance with this embodiment.

Meanwhile, a problem of a conventional fabrication method in which the first micro-lens array and the second micro-lens array are separately fabricated is that a change or other disturbance in the fabrication conditions of the respective micro-lens arrays may result in different lens pitches between the first micro-lens array and the second micro-lens array. On the other hand, another advantage of the production method in accordance with the present embodiment is that it restrains a lens-pitch misregistration between layers, because the second micro-lens array is formed by using the first micro-lens array as a mask.

The micro-lens array substrate in accordance with this embodiment adopts a configuration in which the first microlens array is sandwiched between two inorganic dielectric substrates. The inorganic dielectric substrate undergoes only slight thermal expansion, is strong, and can be accurately planarized by polishing. Therefore, a highly flat surface can be provided for the second micro-lens array by forming the second micro-lens array on the polished surface of the inorganic dielectric substrate.

Furthermore, because inside the glass substrate is homogenous, the indented portions formed by etching have only slight variations. Further, using the same material for the substrate and the glass middle layer will prevent a lens-pitch misregistration between the first micro-lens array and the second micro-lens array caused by thermal expansion.

(Second Production Method.)

A second production method of the double-layer micro-lens array substrate in accordance with the present invention is described below with reference to FIG. 7. FIG. 7 is a cross sectional view showing production steps of a micro-lens array substrate. The method is the same as the first production method up to the step of forming the silica glass sheet made of an inorganic dielectric material. Accordingly, a further explanation thereof is omitted here.

Figure 7A:
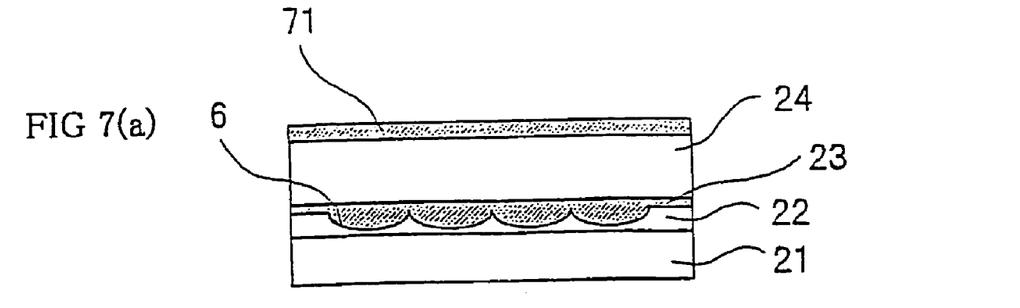

After the silica glass sheet 24 has been formed, a high-refractive ultraviolet curable resin 71, for use as a constituting member of the second micro-lens array 7, is applied on the silica glass sheet 24 as shown in FIG. 7(a). The high-refractive ultraviolet curable resin 71 is cured by irradiation of ultraviolet light on the side of the high-refractive ultraviolet curable resin 71. Here, the high-refractive ultraviolet curable resin 71 is planarized at the same time.

Figure 7B:
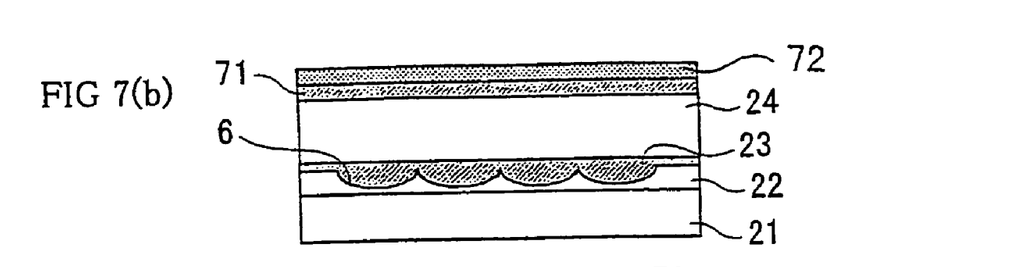

Next, as shown in FIG. 7(b), a resist layer 72 is applied on the high-refractive ultraviolet curable resin 71. As in the first production method, the resist layer 72 is exposed to ultraviolet light through the first micro-lens array 6. In addition, in this production method, the intensity distribution of exposure light is adjusted so that the exposure is stronger around the center of the optical axes of the respective lenses on the first micro-lens array 6.

Figure 7C:
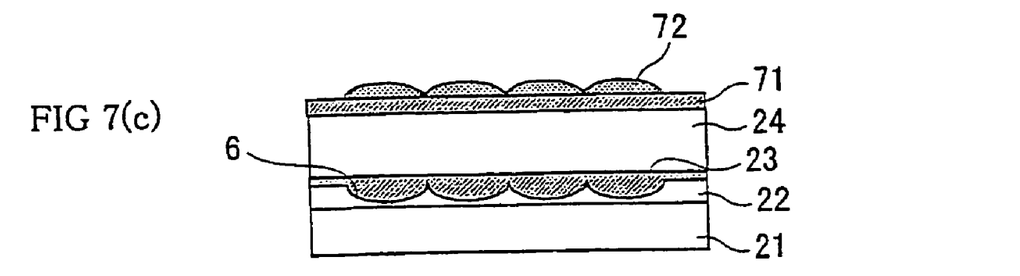

After the exposure, as FIG. 7(c) shows, development is carried out to shape the resist layer 72 into a lens pattern which is thicker at the center of the optical axes. A post-bake process is carried out thereafter.

Figure 7D:
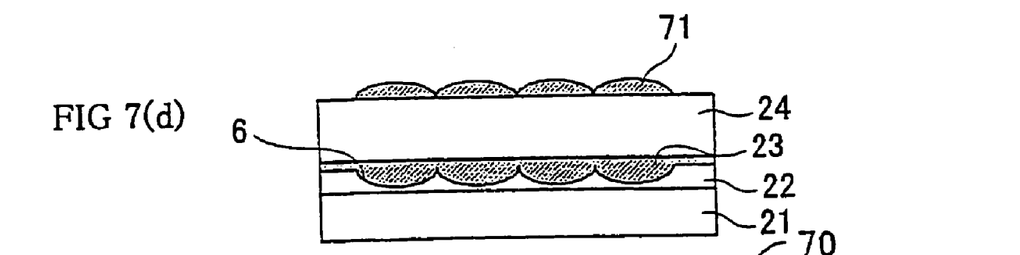

Then, as shown in FIG. 7(d), the lens pattern engraved on the resist layer 72 is transferred to the high-refractive ultraviolet curable resin 71 by dry etching. As in the first production method, a resin and resist material are suitably selected, and a selection ratio of dry etching is determined.

Figure 7E:
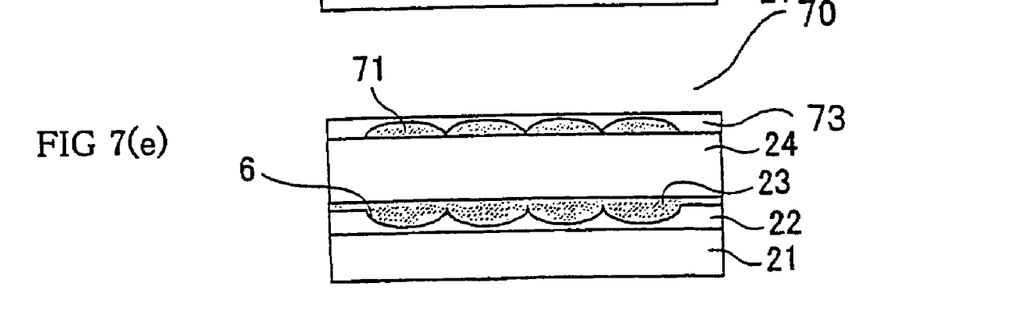

As shown in FIG. 7(e), a low-refractive ultraviolet curable resin 73 is applied on the high-refractive ultraviolet curable resin 71, filling the indented portion of the high-refractive ultraviolet curable resin 71. The low-refractive ultraviolet curable resin 73 is then cured by irradiation of ultraviolet light and planarized to obtain a micro-lens array substrate 70.

As described above, the second production method of a micro-lens array substrate allows the intensity distribution of exposure light to be adjusted, so as to increase the amount of exposure at the center of respective optical axes of the lenses on the first micro-lens array. In general, more aberration is caused as the distance from the center of the optical axis increases, and therefore it is necessary to set the intensity distribution of exposure light by estimating possible deterioration of condensing characteristics.

The first production method requires a consideration particularly in the design of intensity distribution of exposure light, because the exposure is targeted in areas where large aberration occurs. On the other hand, in the second production method, the exposure is targeted in areas near the optical axes of the lenses. This reduces deterioration of condensing characteristics, and enables lenses to be easily formed in shapes according to the intensity distribution of exposure light. This is advantageous in the designing of intensity distribution of exposure light, and in the formation of required lens shape.

(Third Fabrication Method)

Figure 8A:
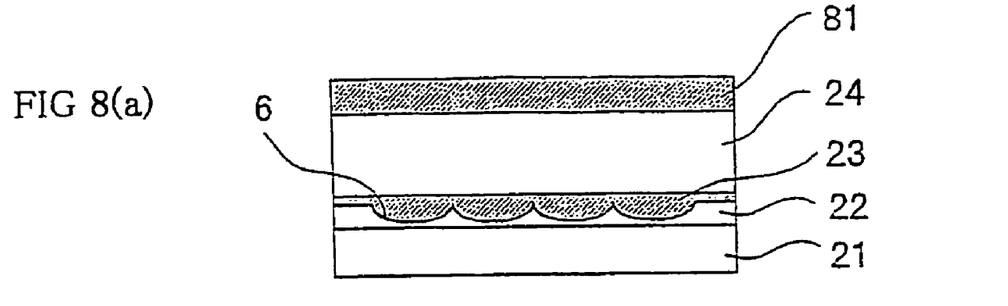
Figure 8B:
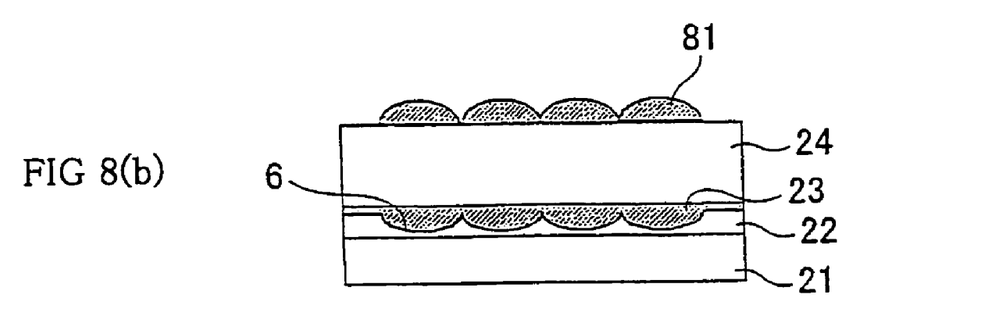
Figure 8C:
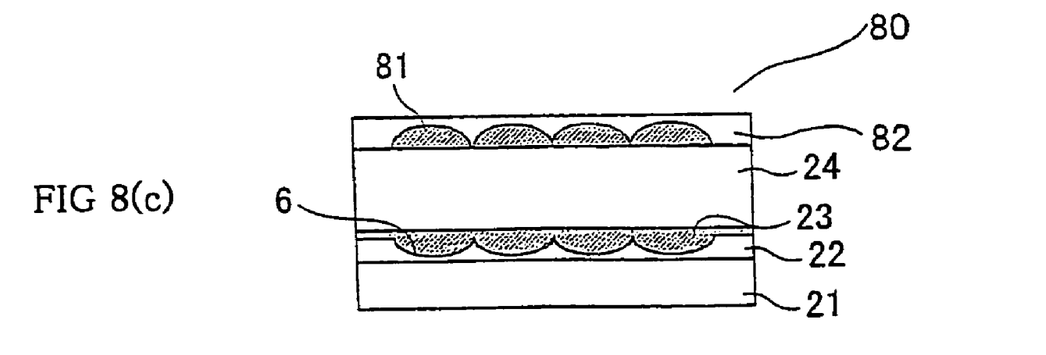

A third production method of a double-layer micro-lens array substrate in accordance with this embodiment is described below with reference to FIG. 8. FIG. 8 shows cross sectional views showing production steps of a micro-lens array substrate. The method is the same as that in the first embodiment up to the step of forming the silica glass sheet 24. Accordingly, a further explanation thereof is omitted here.

First, as FIG. 8(a) shows, a high-refractive ultraviolet curable resin 81 for use as a constituting member of the second micro-lens array, is applied after the formation of the silica glass sheet 24.

Next, the high-refractive ultraviolet curable resin 81 is cured by irradiation of ultraviolet light through the first micro-lens array 6, using the exposure optical system described above. Cured portion of the high-refractive ultraviolet curable resin 81 can have different thicknesses depending on the intensity distribution of the ultraviolet light, and therefore the resin layer can be formed into a required shape by controlling intensity distribution of the ultraviolet light.

Uncured portions are removed by soaking the micro-lens array substrate in an organic solvent after the exposure of the high-refractive ultraviolet curable resin 81. As a result, the high-refractive ultraviolet curable resin 81 forms a lens pattern for the second micro-lens array, as shown in FIG. 8(b). Then, the high-refractive ultraviolet curable resin 81 is completely cured by the irradiation of ultraviolet light on the side of the high-refractive ultraviolet curable resin 81.

Next, as shown in FIG. 8(c), a low-refractive ultraviolet curable resin 82 is applied on the high-refractive ultraviolet curable resin 81, filling indented portions of the high-refractive ultraviolet curable resin 81. Then, the low-refractive ultraviolet curable resin 82 is cured by irradiation of ultraviolet light and planarized to obtain a micro-lens array substrate 80.

The production method does not require a dry-etching step in which the shape of resist layer is transferred, and accordingly the production process can be simplified and production cost can be further reduced.

Either one of the two exposure optical systems described in the first production method can be used in the second and the third production methods, depending on the shape or accuracy of a micro-lens array to be fabricated.

The present embodiment described an arrangement of the second micro-lens array as it is disposed on the liquid crystal layer. However, the first micro-lens array may be formed using the second micro-lens array as a mask.

Further, in the production manufacturing methods of a micro-lens array as described in the present embodiment, namely, in the production manufacturing methods in which the second micro-lens array is formed using the first microlens array as a mask, description was made based on the structure in which the first micro-lens array is sandwiched between two inorganic dielectric substances. However, the present invention is not limited to such structure and is also applicable to a conventional double-layer micro-lens array whose micro-lens arrays are formed on the both sides of an inorganic dielectric substrate.

As described, in a micro-lens array substrate in accordance with the present invention, the first micro-lens array is sandwiched between two inorganic dielectric substrates, and the second micro-lens array is formed on one of two inorganic dielectric substrates.

According to this configuration, the first micro-lens array and the second micro-lens array are formed on the inorganic dielectric substrates which undergo only slight thermal expansion. Therefore, a heat-caused lens-pitch misregistration between the respective micro-lens arrays is prevented.

Further, since patterning for the lens shape of the second micro-lens array can be carried out using the first micro-lens array, optical-axis alignment for these two micro-lens arrays becomes unnecessary.

Thus, the present invention prevents a lens-pitch misregistration and does not require optical-axis alignment for the two micro-lens arrays. Therefore, a highly accurate micro-lens array substrate can be produced at low cost.

Moreover, in the configuration of the micro-lens array substrate, the first micro-lens array and the second micro-lens array may be made from a layer of resin whose refractive index is different from that of the inorganic dielectric substrate.

Further, the second micro-lens array in the configuration of the micro-lens array substrate may be a stack of two or more layers of resin whose respective refractive indexes are different from one another.

Further, in the configuration of the micro-lens array substrate, an ultraviolet curable resin may be used for the second micro-lens array.

A production method of a micro-lens array substrate in accordance with the present invention includes the steps of:
forming on an inorganic dielectric substrate a first micro-lens array with a plurality of lenses;
applying a photosensitive resin on the first micro-lens array;
patterning the photosensitive resin by irradiation of ultraviolet light or visible light; and
forming a second micro-lens array using the patterned photosensitive resin as a mask,
said step of patterning the photosensitive resin being carried out using a beam that has transmitted through the first micro-lens array.

In the method, the first micro-lens array is formed on the inorganic dielectric substrate, which undergoes only slight thermal expansion. Therefore, it is possible to prevent a heat-caused lens-pitch misregistration between the respective micro-lens arrays.

Further, since patterning for the lens shape of the second micro-lens array can be carried out using the first micro-lens array, optical-axis alignment for these two micro-lens arrays is no longer needed.

Thus, the present invention prevents a lens-pitch misregistration and does not require optical-axis alignment for the two micro-lens arrays. Therefore, a highly accurate micro-lens array substrate can be produced at low cost.

The production method of the micro-lens array substrate configured as above may be adapted so that a middle layer made of an inorganic dielectric material is formed on the first micro-lens array substrate, and that the photosensitive resin, which is formed on the middle layer, is patterned by irradiation of visible light or ultraviolet light through the first micro-lens array and the middle layer, so as to form the second micro-lens array.

In the production method of the micro-lens array substrate as configured above, the first micro-lens array may be set to have a focal plane in the vicinity of the photosensitive resin formed on the middle layer.

The production method of the micro-lens array substrate as configured above may be adapted so that a negative resist layer is used as the photosensitive resin, that the negative resist layer is patterned by irradiation of the beam that has transmitted through the first micro-lens array, and that etching is carried out on the negative resist layer so as to transfer a patterned shape of the negative resist layer to the inorganic dielectric substrate.

With this method, exposure is targeted in areas near the optical axes of respective lenses of a first micro-lens array. This reduces deterioration of condensing characteristics, and enables lenses to be formed in shapes according to the intensity distribution of exposure light.

Furthermore, the production method of the micro-lens array substrate configured as above may be adapted so that the photosensitive resin formed on the inorganic dielectric substrate has a two-layer structure of a first photosensitive resin and a second photosensitive resin, and that production method further includes the steps of:
applying and curing a visible light curable resin or an ultraviolet curable resin as said first photosensitive resin on the inorganic dielectric substrate; and
applying a negative resist as the second photosensitive resin, and
that:
the second photosensitive resin is patterned into the second micro-lens array; and
the second micro-lens array is etched to transfer the pattern of the second micro-lens array to the first micro-lens array.

Further, the production method of the micro-lens array substrate as configured above may be adapted so that an ultraviolet curable resin is used as the photosensitive resin formed on the inorganic dielectric substrate, and that the second micro-lens array is formed by:
curing the ultraviolet curable resin by irradiation of the beam that has transmitted through the first micro-lens array, and
removing uncured portions of the ultraviolet curable resin with an organic solvent.

The method does not require a dry-etching step in which the shape of resist layer is transferred. Accordingly, the production process can be simplified, and production cost can be further reduced.

Further, the production method of the micro-lens array substrate as configured above may be adapted so that the first micro-lens array is irradiated with a parallel ray with a uniform intensity distribution, and that patterning of the second micro-lens array is carried out with the micro-lens array substrate tilted with respect to an optical axis of the parallel ray.

Further, the production method of the micro-lens array substrate as configured above may be adapted so that patterning of the second micro-lens array is carried out using an image formed by irradiating the first micro-lens array with light whose intensity distribution has been determined by a transmittance modulation mask whose transmittance is continuously modulated.

Further, a projection liquid crystal display device of the present invention includes:

a white beam source;

beam splitting means for splitting a white beam from said white beam source into a plurality of beams of different wavelength bands;

a liquid crystal element, which is irradiated with the beams split by said beam splitting means; and projection means for projecting a plurality of beams modulated through said liquid crystal display element, said liquid crystal display element having a first micro-lens array and a second micro-lens array on a side closer to said white beam source, and said second micro-lens array having a lens shape patterned by beams that have transmitted through said first micro-lens array.

The projection liquid crystal display device as configured above has the same effects as a micro-lens array substrate in accordance with the present invention.

A micro-lens array substrate according to the present invention, in which first and second micro-lens arrays respectively having a plurality of lenses are formed on plates of inorganic dielectric material, may be adapted so that the first micro-lens array is sandwiched between the two inorganic dielectric substrates, and that the second micro-lens array is formed on one of the two inorganic dielectric substrates.

A production method of a micro-lens array substrate in accordance with the present invention may include the steps of: forming on an inorganic dielectric substrate a first micro-lens array with a plurality of lenses; applying a photosensitive resin; patterning the photosensitive resin by irradiation of visible light or ultraviolet light; and forming a second micro-lens array based upon the patterned photosensitive resin, wherein the photosensitive resin is patterned using a beam that has transmitted through the first micro-lens array.

A projection liquid crystal display device of the present invention may include: a white beam source; beam splitting means for splitting a white beam from said white beam source into a plurality of beams of different wavelength bands; a liquid crystal element, which is irradiated with the beams split by said beam splitting means; and projection means for projecting a plurality of beams modulated through said liquid crystal display element, wherein: the liquid crystal display element has a first micro-lens array and a second micro-lens array on a side closer to said white beam source, the first micro-lens array is formed by molding; and the second micro-lens array has a lens shape patterned by beams that have transmitted through the first micro-lens array.

INDUSTRIAL APPLICABILITY

The present invention thus described is well suited to prevent a lens-pitch misregistration of two micro-lens arrays. Moreover, the invention is suitable for simplifying the fabrication of micro-lens array substrates as the invention no longer requires optical axis alignment for two micro-lens arrays.

The invention claimed is:

1. A production method of a micro-lens array substrate, comprising the steps of:

forming on an inorganic dielectric substrate a first micro-lens array with a plurality of lenses;

applying a photosensitive resin on the first micro-lens array;

patterning the photosensitive resin by irradiation of ultraviolet light or visible light; and forming a second micro-lens array using the patterned photosensitive resin as a mask, said step of patterning the photosensitive resin being a step of forming the photosensitive resin into a required shape by adjusting a distribution of exposure light in the photosensitive resin by use of a beam that has transmitted through the first micro-lens array.

2. The production method of a micro-lens array substrate as set forth in claim 1, wherein:

a middle layer made of an inorganic dielectric material is formed on the first micro-lens array substrate, and the photosensitive resin, which is formed on the middle layer, is patterned by irradiation of visible light or ultraviolet light through the first micro-lens array and the middle layer, so as to form the second micro-lens array.

3. The production method of a micro-lens array substrate as set forth in claim 2, wherein the first micro-lens array is set to have a focal plane in the vicinity of the photosensitive resin formed on the middle layer.

4. The production method of a micro-lens array substrate as set forth in claim 2 or 3, wherein:

a negative resist layer is used as the photosensitive resin;

the negative resist layer is patterned by irradiation of the beam that has transmitted through the first micro-lens array; and etching is carried out on the negative resist layer so as to transfer a patterned shape of the negative resist layer to the middle layer.

5. The production method of a micro-lens array substrate as set forth in any one of claims 1 through 3, wherein:

the photosensitive resin formed on the inorganic dielectric substrate has a two-layer structure of a first photosensitive resin and a second photosensitive resin, and said production method further comprises the steps of:

applying and curing a visible light curable resin or an ultraviolet curable resin as said first photosensitive resin on the inorganic dielectric substrate; and applying a negative resist as the second photosensitive resin, and wherein:

the second photosensitive resin is patterned into the second micro-lens array; and the second micro-lens array is etched to transfer the pattern of the second micro-lens array to the first micro-lens array.

6. The production method of a micro-lens array substrate as set forth in any one of claims 1 through 3, wherein:

an ultraviolet curable resin is used as the photosensitive resin formed on the inorganic dielectric substrate, and the second micro-lens array is formed by:

curing the ultraviolet curable resin by irradiation of the beam that has transmitted through the first micro-lens array, and removing uncured portions of the ultraviolet curable resin with an organic solvent.

7. The production method of a micro-lens array substrate as set forth in any one of claims 1 through 3, wherein:

the first micro-lens array is irradiated with a parallel ray with a uniform intensity distribution; and patterning of the second micro-lens array is carried out with the micro-lens array substrate tilted with respect to an optical axis of the parallel ray.

8. The production method of a micro-lens array substrate as set forth in any one of claims 1 through 3, wherein patterning of the second micro-lens array is carried out using an irradiated light image formed by irradiating the first micro-lens array with irradiated light whose intensity distribution has been determined by a transmittance modulation mask whose transmittance is continuously modulated.

9. A production method of a micro-lens array substrate comprising the steps of:
    forming a first micro-lens array having a plurality of lenses;
    applying a photosensitive resin on the first micro-lens array;
    patterning the photosensitive resin by irradiation of ultraviolet light or visible light;
    forming a three-dimensional structure using the patterned photosensitive resin as a mask;
    forming on an inorganic dielectric substrate the first micro-lens array having the plurality of lenses;
    pasting a middle substrate on the inorganic dielectric substrate with a predetermined resin in between;
    polishing a surface of the middle substrate, opposite the inorganic dielectric substrate, so as to adjust a thickness of the middle substrate to a predetermined thickness; and
    applying the photosensitive resin on the polished surface of the middle substrate, so as to form the three-dimensional structure,
    said step of patterning the photosensitive resin being a step of forming the photosensitive resin into a required shape by adjusting a distribution of exposure light in the photosensitive resin by use of a beam that has transmitted through the first micro-lens array.

10. The production method of a micro-lens array substrate as set forth in claim 9, wherein the three-dimensional structure is a second micro-lens array.

11. The production method of a micro-lens array substrate as set forth in claim 9, wherein a focal plane of the first micro-lens array is set in a vicinity of the photosensitive resin formed on the middle substrate.

12. The production method of a micro-lens array substrate as set forth in claim 10, wherein:
    the photosensitive resin formed on the middle substrate has a two-layer structure of a first photosensitive resin and a second photosensitive resin; and
    said production method further comprises the steps of:
    applying and curing a visible light curable resin or a ultraviolet curable resin as the first photosensitive resin on the middle substrate; and
    applying a negative resist as the second photosensitive resin, and wherein: the second photosensitive resin is patterned into the second micro-lens array; and
    the second micro-lens array is etched to transfer the pattern of the second micro-lens array to the first photosensitive resin.

13. The production method of a micro-lens away substrate as set forth in claim 10, wherein:
    an ultraviolet curable resin is used as the photosensitive resin on said middle substrate; and
    the second micro-lens array is formed by:
    curing the ultraviolet curable resin by irradiation of the beam that has transmitted through the first micro-lens array; and
    removing uncured portions of the ultraviolet curable resin with an organic solvent.

14. A production method of a three-dimensional structure comprising the steps of:
    applying a photosensitive resin on an optical member;
    patterning the photosensitive resin by irradiation of visible light or ultraviolet light; and
    forming a three-dimensional structure using the patterned photosensitive resin as a mask,
    said step of patterning the photosensitive resin being a step of forming the photosensitive resin into a required shape by adjusting a distribution of exposure light in the photosensitive resin by use of a light beam that has transmitted through an optical element having condensing function, said optical element having condensing function is irradiated with a parallel ray having a uniform intensity distribution, and patterning of the three-dimensional structure is carried out by tilting the optical member with respect to an optical axis of the parallel ray.

15. The production method of a three-dimensional structure as set forth in claim 14, wherein said optical element having condensing function is formed or fixed on said optical member.

16. The production method of a three-dimensional structure as set forth in claim 14 or 15, wherein a plurality of said optical elements having condensing function are provided.

17. The production method of a three-dimensional structure as set forth in claim 14, wherein the three-dimensional structure is patterned by:
    adjusting a tilt angle of the optical member; and
    adjusting intensity or irradiation time of the irradiated parallel light.

18. A production method of a three-dimensional structure comprising the steps of:
    applying a photosensitive resin on an optical member;
    patterning the photosensitive resin by irradiation of visible light or ultraviolet light; and
    forming a three-dimensional structure using the patterned photosensitive resin as a mask,
    said step of patterning the photosensitive resin being a step of forming the photosensitive resin into a required shape by adjusting a distribution of exposure light in the photosensitive resin by use of a light beam that has transmitted through an optical element having condensing function, and
    patterning of the three-dimensional structure is carried out using an irradiated light image formed by irradiation of the optical element having condensing function with irradiated light whose intensity distribution has been determined by a transmittance modulation mask whose transmittance is continuously modulated.

* * * * *